(12) United States Patent
Levin et al.

(10) Patent No.: US 10,891,140 B1
(45) Date of Patent: Jan. 12, 2021

(54) DYNAMIC CONFIGURATION MANAGEMENT

(71) Applicant: Amazon Technologies, Inc., Reno, NV (US)

(72) Inventors: Alex Levin, Santa Clara, CA (US); Georgy Zorik Machulsky, San Jose, CA (US); Idan Aharoni, Zichron Yaakov (IL); Barak Wasserstrom, Mizpe Aviv (IL); Erez Tsidon, Moreshet (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 16/144,267

(22) Filed: Sep. 27, 2018

(51) Int. Cl.
*G06F 9/455* (2018.01)
*G06F 9/445* (2018.01)

(52) U.S. Cl.
CPC ...... *G06F 9/44505* (2013.01); *G06F 9/45558* (2013.01)

(58) Field of Classification Search
CPC ............ G06G 9/44505; G06F 9/45558
See application file for complete search history.

(56) References Cited

U.S. PATENT DOCUMENTS

| | | | | |
|---|---|---|---|---|
| 6,711,676 B1 * | 3/2004 | Zomaya | .................... | G06F 8/64 713/1 |
| 7,171,458 B2 * | 1/2007 | Brown | ................ | G06F 9/44505 370/254 |
| 8,775,577 B1 * | 7/2014 | Alford | .................... | H04L 67/34 709/221 |
| 9,846,576 B2 * | 12/2017 | Dubal | .................... | G06F 8/654 |
| 2012/0110142 A1 * | 5/2012 | Montagna | ........... | H04L 41/0853 709/220 |

* cited by examiner

*Primary Examiner* — Stefan Stoynov
(74) *Attorney, Agent, or Firm* — Hogan Lovells US LLP (57) ABSTRACT

Configuration snapshots can be obtained from various connected devices, such as network interface cards or hardware offload devices, to determine whether the configuration matches expected values. If discrepancies are determined then the appropriate values can be automatically applied to those devices. For each type and version of device, there can be a set of expected configuration values, or a golden model of configuration, that is determined and stored. The models can also be used to test updated configuration values, as the new values can be pushed to a subset of devices and the impact on performance determined. If acceptable performance improvement is detected, or another such target achieved, then the golden model can be updated with the new values and those values can be pushed out to the remainder of the devices.

19 Claims, 7 Drawing Sheets

DYNAMIC CONFIGURATION MANAGEMENT

BACKGROUND

As computing technology continues to advance, an increasing amount of data is being processed and stored electronically. In many instances, resources will be provided from a shared resource environment, also sometimes referred to as the cloud, where resources can be allocated to users or tasks on an as-needed basis. For resource environments with a large number of users or large number of concurrent instructions to be processed, this can result in a complicated set of resources, which can change frequently over time. The changes can include not only new computing systems, but also additional components and updated configurations. It can be difficult to manage the various configurations, as well as to make sure that the appropriate configurations are being used at all times.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for dynamic management and updating of configuration values for connected (or connectable) devices. In particular, various approaches can determine when there are discrepancies between the expected and actual configuration values for various types and versions of connected devices, and can cause the appropriate values to be automatically applied to those devices. The devices can be network interface cards, for example, which can include components such as additional processors, memory, and communication interfaces. For each type and version of device, there can be a set of expected configuration values, referred to herein as a "golden" model of configuration, that is determined and stored. This information can be used to identify discrepancies with respect to the actual configuration of any of a number of different devices, and can help to ensure that the appropriate configuration is in place for a particular type and version of device, as well as for the current host, application, network state, etc. Such an approach can also be used to test updated configuration values, as the new values can be pushed to a subset of devices and the impact on performance determined. If acceptable performance improvement is detected, or another such target is achieved, then the golden model can be updated with the new values and those values can be pushed out to the remainder of the devices.

Various other functions can be implemented within the various embodiments as well as discussed and suggested elsewhere herein.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
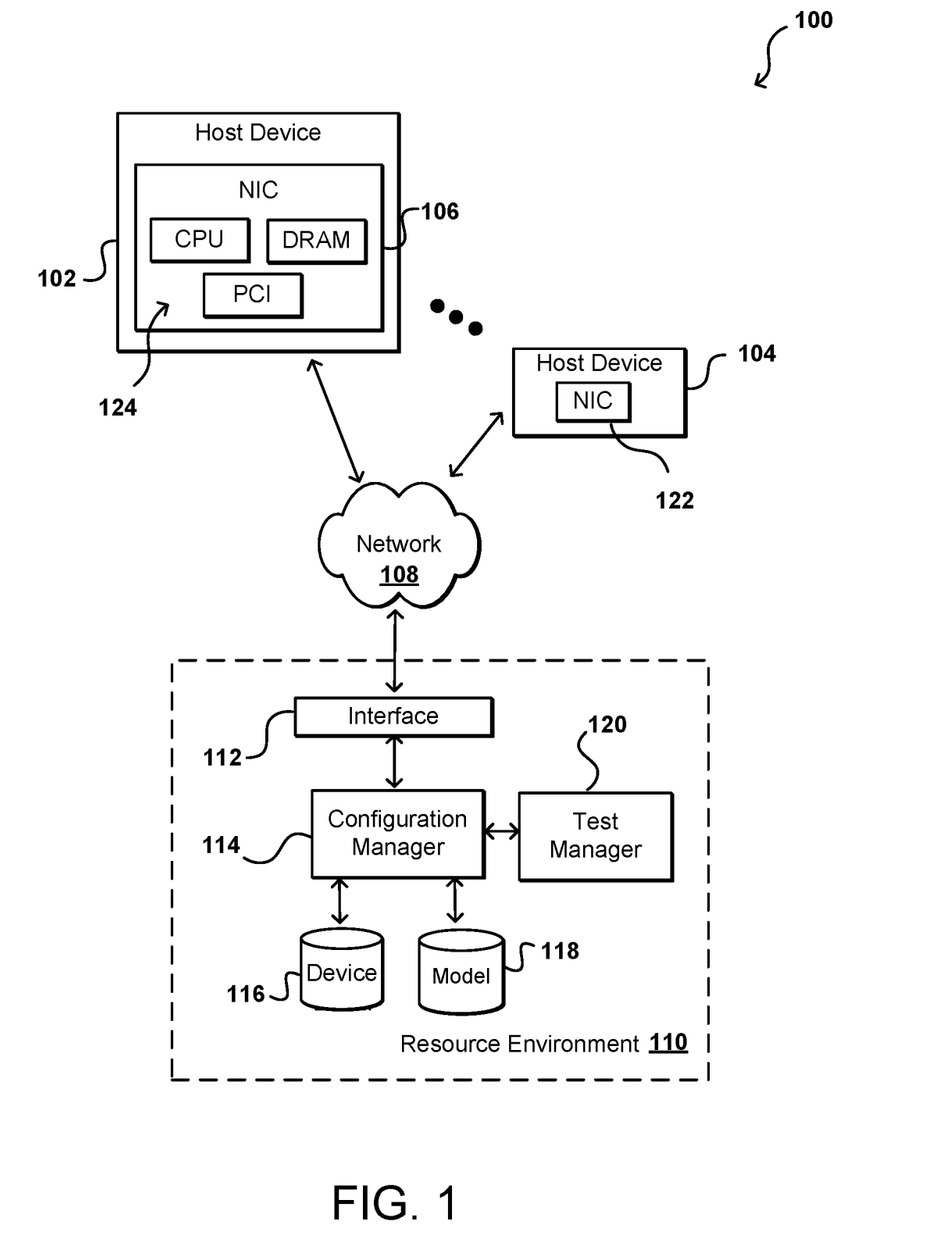
FIG. 1 illustrates an example system for managing configuration for peripheral cards on host machines that can be utilized in accordance with various embodiments.

FIG. 1 illustrates an example system 100 that can be utilized to perform various tasks, such as to execute instructions or process data for one or more entities, in accordance with various embodiments. In this example, instructions are able to be processed using a distributed set of resources, such as a set of host devices 102, 104. The hosts can be physical hosts, such as servers or computing devices, or virtual hosts, such as virtual machines or machine instances running on a physical machine. In this example, the physical machines can have one or more connected devices installed or allocated that can provide additional functionality, such as additional memory or storage, additional processing capacity, additional network or communications capability, and the like. Connected devices can include, for example, network devices such as network interface cards that allow for communication across at least one network. Connected devices might not communicate over a network in some embodiments, however, and may communicate directly with another computer system or other devices connected locally, among other such options. The connected devices in the illustrated example are network interface cards 106, 122 that can be installed in the appropriate slot(s) on the respective machines. If a physical machine hosts multiple virtual machines, there may be a network interface card (NIC), or other hardware offload card, dedicated to one or more individual virtual machines, or a MC for every virtual machine (VM) functioning as a specific type of host, among other such options. As mentioned, the NICs can include various components, as may include one or more processors (e.g., central processing units (CPUs) or graphics processing units (GPUs), memory (e.g., flash or DRAM), communications components (e.g., PCI interfaces), etc. The host devices 102 can store the relevant data and instructions, and execute the specified applications, in order to provide specific functionality for one or more entities, such as customers of a resource environment 110. Although illustrated outside the resource environment in this example, it should be understood that the host devices can be provided using resources in the resource environment as well in some embodiments. The resource environment can be a shared resource environment or multi-tenant environment in at least some embodiments. Various other types of hardware offload cards or devices can be used as well within the scope of the various embodiments, as may include devices capable of performing at least a portion of the functionality of a connected host, for example, which frees up processing capacity of the host to perform other tasks.

The physical machines can include any appropriate electronic devices operable to send and receive requests, messages, or other such information over an appropriate network 108, as well as to perform appropriate operations on, or with respect to, the data pertaining to those requests or messages, etc. The physical machines may also include client devices in some embodiments, which may be operated by the customers or users themselves. Examples of such machines include personal computers, tablet computers, servers, set top boxes, game consoles, smart phones, notebook computers, and the like. A host device 102, 104 can perform an operation using the respective MC and, in at least some instances, can use the communications components of the NIC to communicate over at least one network 108, such as the Internet and/or a cellular network, among other such options. The communication, such as a call or request, can be received to a resource environment 110, for example, which can include resources for data being processed or might offer or host search services for third party content, among other such options. As mentioned, in some embodiments the host devices may be in the resource environment and may not communicate across an external network or through an interface layer 112. The resource environment 110 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In this example, the communication is received to an interface layer 112 configured to direct incoming communications. As discussed in more detail elsewhere herein, the interface layer can include application programming interfaces (APIs) or other exposed interfaces enabling requests to be received by the resource environment 110. The interface layer 112 can include other components as well, such as at least one Web server, routing components, load balancers, and the like. When a communication including performance metrics is received, for example, the communication (or information from the communication) can be forwarded by the interface layer 112 to a configuration manager 114 or other such sub-system or service for processing the data in the communication. The configuration manager 114 can analyze the data, and attempt to dynamically determine the appropriate configuration for the NIC allocated to the corresponding host device.

In this example, the configuration manager 114 can take information from the communication to identify a type, version, and/or other information for the respective NIC. This information can be used to determine the appropriate configuration state for that NIC. If there are differences between the configuration of the MC and the expected or appropriate configuration, or if there have been updates, then the configuration information can be updated as appropriate. This can include, for example, locating the relevant information in a device repository 116 to ensure that the appropriate type of device is determined or identified. Configuration state data can also be determined from, for example, model data stored to a model repository 118. There may be one model for each different version or type of relevant connected device, or one model that includes configuration information for all such devices. The model in some embodiments will include an ideal, optimal, preferred, current, or other expected set of configuration values for the relevant connected device(s). The configuration manager, once determining the appropriate configuration values if different from the current values, can cause these values to be set for the relevant connected device. A test manager 120 can also be used, as discussed elsewhere herein, to attempt to determine improved or updated configuration parameters and/or values, as may be relevant for a current network state or updated application version, etc. The test manager can update the relevant model, or create a test version of the model (a "test configuration model"), that can include values to be applied for a subset of the relevant connected devices. The results can be monitored, and if performance is improved then the test values can be caused to be stored to the current model for those devices, or the test model can be caused to become the current model, among other such options. If performance is not improved then there may be further changes made or the changes can be rolled back to cause the configuration of the test devices to be restored to their previous good state. In at least some embodiments, the data from the various connected devices can be fed to a trained machine learning model, or other such algorithm or process, to attempt to predict parameters and/or values for the configuration for one or more devices. The output of the trained model can be used to generate the test configuration model, and the resulting changes in performance can be used to further train the model in at least some embodiments.

As mentioned, it may be the case that there can be various different types or versions of hosts or other computing resources in such an environment. There may also be various types or versions of individual components, such as add-in or peripheral cards utilized for those hosts. In this example, hosts on different physical machines can each utilize a separate network interface card (MC). A primary example utilized herein will be a peripheral component interconnect (PCI) or peripheral component interconnect express (PCIe) card that can connect to a physical host or machine using a PCI bus. An example PCIe card provides additional processing and storage capacity, although it should be understood that other types of cards or components can take advantage of aspects of the present invention as well within the scope of the various embodiments. For the MC cards 106, 122 illustrated, which are each PCI cards in this example, the cards will include components such as a processor or CPU, memory (e.g., DRAM), and connectivity or network interface. Various other components, such as buses or interfaces, can be utilized as well as known for such components. These cards can help provide additional and/or dedicated processing capacity and memory for specific hosts or devices.

For large data centers, server farms, or other such resource deployments, there may be a number of different types or versions of such cards utilized over time. In one example implementation alone there are three generations of processors utilized by around forty different PCIe add-in cards. Different cards may have different categorizations in some embodiments, such as fast, medium, or slow, which may impact the relevant configuration. Different types of cards may also execute different applications as well, such as may include network interface applications, cryptography engines, non-volatile memory express (NVMe) controllers, hardware compression offloaders, and the like, as well as different versions or architectures of similar types of applications. Even for similar types of cards, there may be different hardware components utilized that may behave slightly differently. For example, there may be different memory configurations and capacities, such as may utilize a 32 or 64 bit bus, have one or two channels, have a 1.0-32 GB frequency, or ECC support, among other such variations. A card might provide a different amount, type, or configuration for network connectivity, such as different speeds (e.g., 1, 2, 2.5, 5, 10, 40, 50, or 100 mbps) of Ethernet connectivity. Different types of processors may be utilized or configured, such as to provide a different number of cores (e.g., 1, 2, 4, or 16) or different operating frequencies. Different cards may also have different types of interface support and configuration, such as for i2c, SPI, NAND, etc. There can be different speeds and width attributes for PCIe as well, such as from 2 bytes to 16 bytes, Gen 1.0 to Gen 3.0, etc. There may be different bus configurations as well, as may relate to a maximum number of outstanding requests. Various other differences can be provided as well as would be apparent in light of the present disclosure.

Based at least in part upon these differences, as well as differences in the relevant hosts or usage, there may be many different configurations utilized that are appropriate for the various selections or combinations of components. Unfortunately, many of these cards will look similar to the human eye or will otherwise be difficult to quickly analyze to determine the appropriate configuration. The different types of applications and relevant network states can further complicate this configuration determination. Thus, a card might be placed improperly or have a suboptimal (or even erroneous) configuration applied. In some instances errors in development can result in non-optimal use of such a device or component. In various conventional approaches, such situations were detected primarily through manual review, which is a lengthy and complicated process that is prone to simple mistakes for similar components, applications, or configurations. Undetected problems, or sub-optimal configurations that are not corrected, can negatively impact the overall performance of the system, which can result in additional processing and memory capacity needed, as well as a higher network load, increase in latency, and other such issues.

Accordingly, approaches in accordance with various embodiments provide for the dynamic management of configurations for these and other such devices or components in an electronic environment. In particular, various embodiments provide for the identification of types and versions of network cards utilized in computing devices in a resource environment, as well as the management of configuration for those cards. Such an approach can help to ensure that the appropriate configuration is applied for a specific card, and can also help to update or improve that configuration over time based on various factors, such as changes in network state or improved optimization determinations, among other such options.

In one embodiment, software is deployed on the PCIe add-in card, as well as the server tasked with managing the card, or at least software executing on the card. It should be noted that at least some of this functionality can also be implemented in hardware in various embodiments. The software on the server, or the server-side software, can scan the system to identify a set of devices that support this dynamic configuration management. Once such a device or component is identified, the server-side software can obtain a set of metrics from the device, such as by sending a get command to the software executing on the card or by accessing each device register space (i.e., using PCIe BAR mapping). The server-side software can also obtain data as to the usage of that card and/or any application executing on that card, and can obtain application-specific data where available. As will be discussed in more detail elsewhere herein, the device metrics and data can then be compared against an expected configuration state, also referred to herein as a "golden model" of configuration data for the specific card, application, and usage. Similarly, the software on the card can wait for a communication using a shared resource, such as a shared bus, connection, or memory. In response to receiving the request, the device-side software can gather the relevant (or all available) device metrics and report those metrics back to the server, or other caller. Such an approach can help to automate configuration management for these and other such devices and components, moving from an ongoing problem of continually having to make sure that the configuration and usage is correct per every device and application to a situation where there is a one-time configuration set creation for a device, application, and usage, which can be used to automatically and periodically ensure that the appropriate configuration is being utilized for all relevant devices. As mentioned, such an approach also assists with testing and updating configuration for these devices, then ensuring that any approved updates are automatically propagated accordingly.

As mentioned, attempting to determine the appropriate configuration for a new card, or the appropriate updated configuration for an existing card, can be very complex using conventional manual approaches, which can lead to various errors or inconsistencies, which can negatively impact system performance. For new types of cards, there may also be a significant amount of manual testing required to determine the appropriate configuration. As an example, the number of outstanding requests on the PCI bus can be set on a system. The number of outstanding requests can drastically impact the performance, both in terms of bandwidth and latency. Using conventional approaches can also lead to difficulty determining whether a configuration has changed, should have changed, or could advantageously be changed. A continuous monitoring process can be utilized, but using conventional approaches it can be difficult to determine what changed or should have changed, as for a given board or card there may be hundreds of parameters to check, and those parameters can vary between devices.

In some embodiments, the host associated with a given connected device can be an x86 or ARM-based host, which utilizes the x86 or ARM architecture for hardware virtualization. Such architecture enables multiple operating systems to share processing capacity concurrently and efficiently. The host in such an environment can run in a hypervisor, and a corresponding virtual machine can be allocated for use by a customer, user, application, or other such entity. The virtual host in this example can communicate with the PCIe card over the PCI bus. The host can store and execute a small software component that can communicate with the relevant configuration manager, or other such system or service. In one embodiment, a request for information will be received from the configuration manager to the host, and the software component on the host will communicate with a corresponding software component on the PCIe card to generate or provide a current configuration snapshot. The software component on the card will obtain the relevant data for all card components, for example, and generate a current snapshot that is provided back to the software component on the host via the PCI bus. Obtaining the data can include, for example, analyzing internal register space to determine CPU frequency, determining a PCI link status, or determining an Ethernet connectivity state, among other such options as discussed and suggested herein. The form of the snapshot can vary, but in some embodiments can take the form of a set of key-value pairs or comma-separated value list, etc. In at least some embodiments, the configuration snapshot includes a set of sub-configurations, or micro-configurations for the relevant device components in hardware, software, or firmware, for example. The host can then send the configuration snapshot, along with any other relevant data, to the configuration manager for analysis.

In various embodiments, a configuration manager can analyze the configuration snapshot to determine whether the appropriate configuration is applied to the relevant connected device, here the PCIe card. This can include, in at least some embodiments, comparing the values in the configuration snapshot against the values in a "golden model" for that connected device, such as for the type and version of that device and for the relevant application or usage, etc. As mentioned, any detected variance can result in the configuration manager requesting or instructing a configuration update for the relevant connected device.

A golden model, or other configuration state or set, can be generated and updated in a number of different ways in accordance with the various embodiments. In some embodiments, a system architect can generate an initial golden model for a specific type and version of connected device, using information such as current or expected network state, the type of application(s) to be executed, and the type(s) of functionality to be provided, among other such options. The system architect can determine parameter values such as the appropriate operating speed and resource capacity for a relevant application, and can utilize these values to generate the relevant golden model. In some embodiments there may be a template model that is used for certain types of devices, and the system architect can use the template as a starting point and update the appropriate values for the intended usage or placement. Once tested and/or finalized, the golden model can be stored for usage for the relevant type and version of connected device, or other such component, and the configuration data applied accordingly.

As mentioned, however, in many implementations there will be various changes over time, such as changes to the network state or changes made by third parties or other devices in the relevant environment. Some parameters will be variable in their nature, as may relate to fluctuations in processing load or network capacity, application or network updates, and the like. Since there may be hundreds of parameters in some embodiments, this can result in a complex matrix of values that would otherwise need to be manually tracked and updated for the various devices.

Accordingly, the performance of the configuration data in the golden models can be periodically tested using a testing module or service as discussed elsewhere herein. This can include, for example, obtaining performance data and configuration information from the relevant devices, as well as from other components across the network to determine whether performance has degraded in any way. If so, a new set of configuration data can be generated and applied to at least a subset of the connected devices and the performance data examined to determine whether the performance increases as a result of the change. Even if network performance has not degraded significantly, such testing may be performed periodically, or at other appropriate times, to determine whether different configuration values would help to improve overall performance. Thus, the testing module or service might analyze the performance and configuration data to attempt to determine where improvements might be made, and can test the new configuration model on a subset of devices to determine the impact on performance. As mentioned, machine learning or other approaches can be used to determine the test values in at least some embodiments. In some embodiments the configuration data can be pushed to the connected device at certain times whereby the device can compare the data from the golden model to the current configuration state to determine any discrepancies, and can make any adjustments accordingly. Thus, the comparison of the golden model to the configuration data can be performed on the individual cards or devices in at least some embodiments. The data can also be compared to well-defined models in the cloud using thorough testing and analytic processes, which might be too large or complicated to be run on the devices or hosts themselves, to attempt to improve the models over time for current or expected network, application, or device state information. Such an approach can be used to validate the model, as well as to calibrate or optimize the model for the relevant application and implementation. And as mentioned elsewhere herein, a model can include specific values for specific components, such as a specific number of cores for a CPU, but may also include ranges, thresholds, or max/min values for other components or parameters, such as for analog parameters that are susceptible to noise or other parameters where an exact value may not be required. For example, a model might provide an acceptable range of firmware versions for a given type of device.

As mentioned, in many instances a determined configuration discrepancy can be remedied by updating the device to have the current or expected configuration. It might be the case, however, that other actions may be desired for at least certain types of discrepancies. These actions may include, for example, replacing a network card, updating the firmware, installing new software, etc. Various other remedial actions may be taken as well within the scope of the various embodiments. Such an approach can also be used when a technician is merging a new change to software or firmware, where any change in configuration or performance resulting from the merge can be detected and adjusted as appropriate. As mentioned, the testing or configuration management can be performed for devices within a given environment or outside a resource environment, such as where the management is offered as a service to customers or third parties owning or operating components, systems, services, or devices that support the management.

In some embodiments there may be multiple Ethernet adapter types available for host computing instances. A first type of network adapter might offer low (e.g., around 100 Mbps) to moderate (e.g., around 300 Mbps) network throughput, with other network adapters supporting enhanced networking (e.g., around 10 Gbps). Enhanced networking my also utilize specialized hardware support. An adapter can be provided by the underlying virtualization layer, such as the XEN hypervisor. This adapter employs a network virtualization technique that involves significant overheads as it relies on traditional interrupt based (IRQ) approach inherent within the PCIe MC design. In an attempt to support higher network throughput, enhanced networking can be utilized that relies on PCIe NICs equipped with SR-IOV technology that allows a VM to bypass the underlying hypervisor (XEN) and use direct memory access (DMA) instead of interrupting the CPU. An example PCIe NIC can support up to 25 Gbps of network throughput. Assigning a dedicated PCI Network H/W adapter (or port) for each VM on a host can give a line rate throughput, and software-based sharing of I/O device (I/O Virtualization) may impose significant overhead in some implementations. Single Root-Input Output Virtualization (SR-IOV) specification is one of the technologies that can be used to achieve Network Function Virtualization (NFV). It gets its name "Single Root" from the PCIe Root Complex. SR-IOV enables the physical network adapter to be shared directly with the VMs bypassing the hypervisor as shown below.

SR-IOV architecture offers at least two function types. A first involves physical functions (PFs). This is a MC feature for configuring and managing SR-IOV functionality on the device. It is exploited by PF device driver that is part of the hypervisor. A second involves virtual functions (VFs). This is a PCIe function that is used by the respective VMs for communicating directly with the physical NIC. The hypervisor, using the PF device driver, assigns VFs to VMs and then VFs use native virtual function device drivers to directly communicate with the NIC. When a data packet is received by the NIC adapter, the classifier at SR-IOV capable NIC (as configured by the PF device driver) places it to the appropriate queue mapped to the appropriate virtual function and its target VM.

As one skilled in the art will appreciate in light of this disclosure, and as discussed elsewhere herein, certain embodiments may be capable of achieving certain technical advantages, including some or all of the following: reducing network load, reducing memory and processing requirements, reducing service use time, and simplifying user interfaces used to access content. These advantages can be obtained on client devices, network servers, data storage devices, and other such systems or components.

Figure 2:
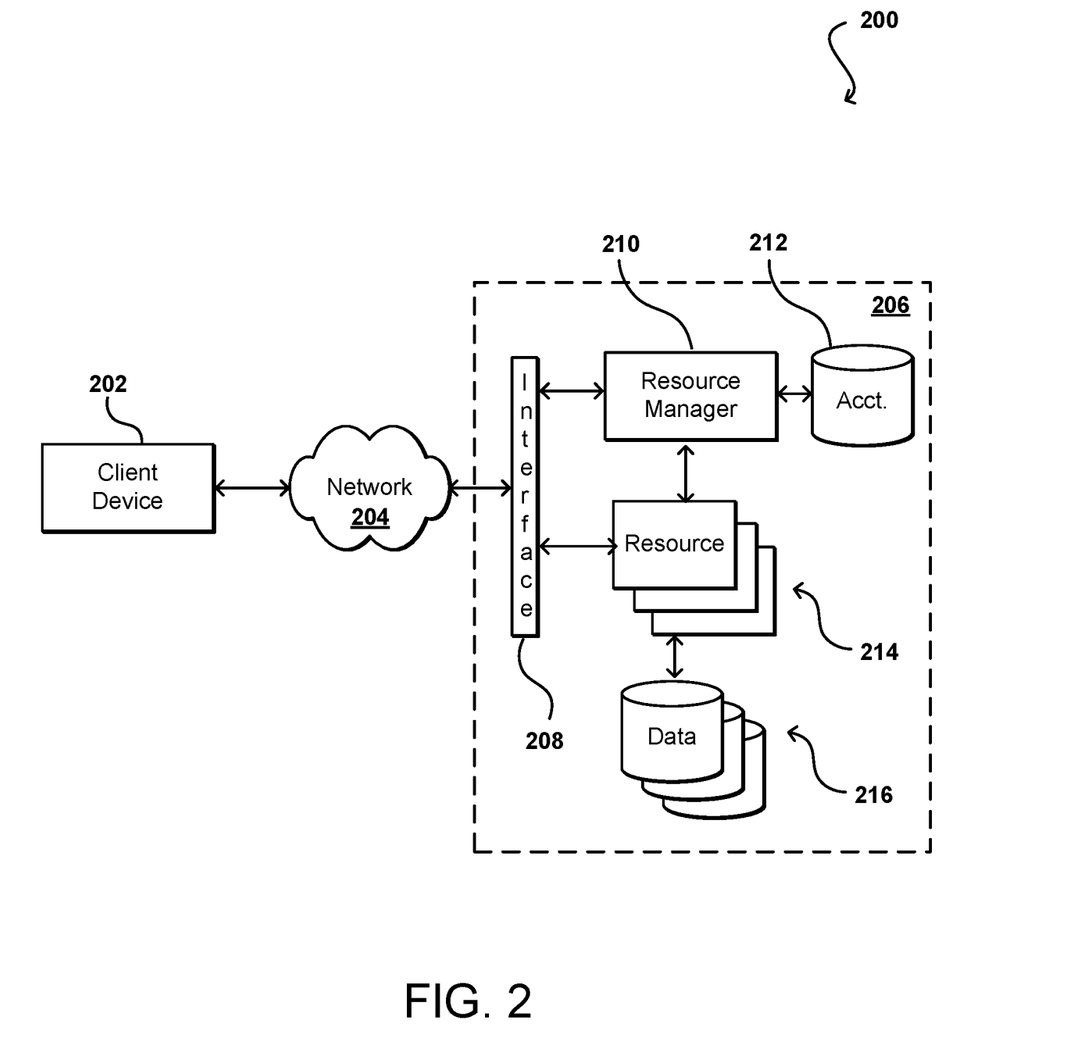
FIG. 2 illustrates an example resource environment that can be utilized to implement aspects in accordance with various embodiments.

FIG. 2 illustrates an example environment 200 in which aspects of the various embodiments can be implemented. In this example a user is able to utilize a client device 202 to submit requests across at least one network 204 to a multi-tenant resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
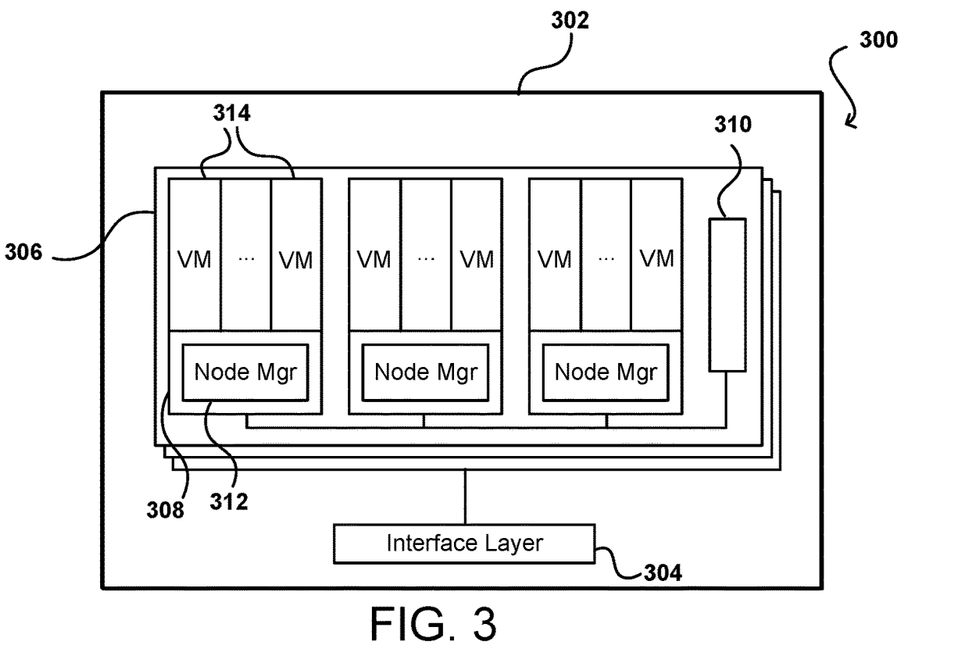
FIG. 3 illustrates an example virtual resource environment that can be utilized to implement aspects in accordance with various embodiments.

FIG. 3 illustrates an example environment 300 in which aspects of the various embodiments can be implemented. As discussed above, a communication can be received to an interface layer 304 of a resource environment or other set of resources. The interface layer 304 may include components such as application programming interfaces (APIs), routers, switches, Web servers, and other such components known or used for routing communications from a computing device to an appropriate resource in the environment. In this example, the resource environment includes a number of racks 306, each rack including a number of host computing devices 308, as well as an optional rack support computing system 310 in this example embodiment. The host computing systems 308 on one of the illustrated racks 306 each host one or more virtual machines 314 in this example, as well as a distinct virtual machine manager 312 associated with the virtual machines on that host computing system. The virtual machine manager (VMM) is tasked with managing the virtual machines (VMs) on the respective host device, and handling various aspects of virtualization. Each virtual machine 314 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 310 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 302. Each computing system may also have one or more local attached storage devices (not shown), such as to store local copies of programs and/or data created by or otherwise used by the executing programs, as well as various other components.

It will be appreciated that the example of FIG. 3 has been simplified for the purposes of explanation, and that the number and organization of host computing systems and other devices may be much larger than what is depicted in FIG. 3. For example, as one illustrative embodiment, there may be approximately tens of thousands of computing systems in a cloud environment, with at least some of those computing systems being host computing systems that may each host multiple virtual machines.

Figure 4:
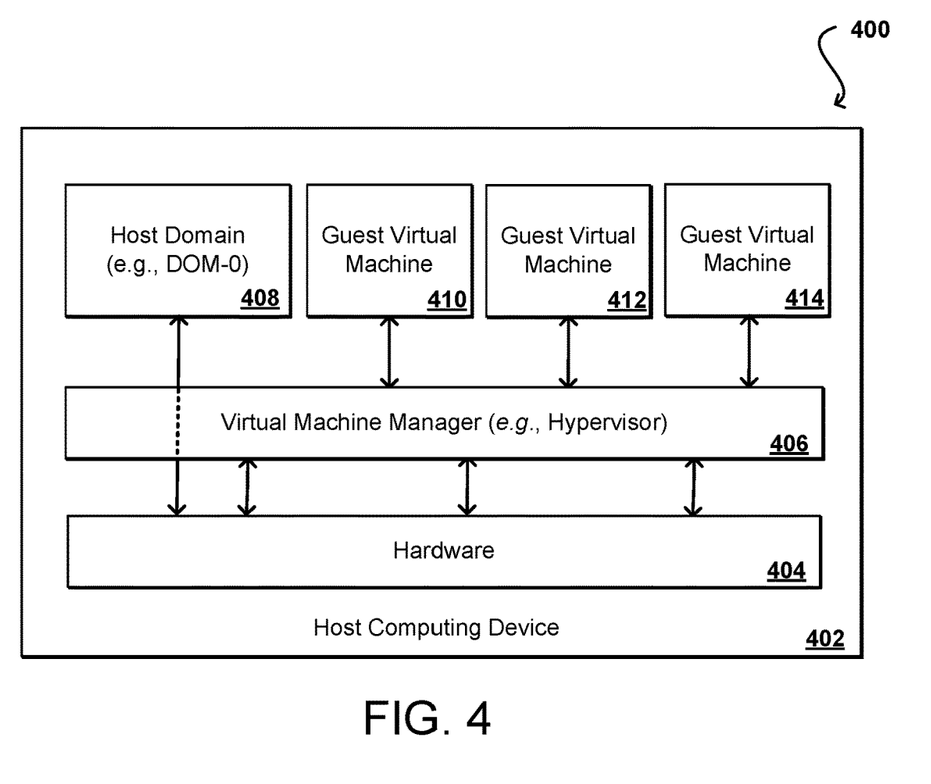
FIG. 4 illustrates an example virtual machine management environment that can be used to implement aspects in accordance with various embodiments.

A number of virtualization techniques can be used to simultaneously operate a plurality of guest virtual machines (VMs) 114 or guest operating systems (OSs) on a given host machine. FIG. 4 illustrates an example system 400 of utilizing one virtualization technique using a virtual machine manager (VMM), such as a hypervisor, in accordance with various embodiments. The hardware 404 (e.g., the central processor and other such components) of the host computing device 402 is able to interface with the VMM 406 running directly on the hardware 404, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 408 that may include an administrative operating system for configuring the operation and functionality of the hypervisor 406, as well as that of domains of lower privilege, such as the domains of the guest virtual machines 410, 412, 414 or other operating systems, which may be heterogeneous (i.e., running different operating systems than each other). The host domain 408 (e.g., the DOM-0) may have direct access to the hardware resources 404 of the host computing device 402 by way of the hypervisor 406, while the guest virtual machine domains 410, 412, 414 may not.

In certain embodiments, there can be various modes of operations. For example, to update the microcode on a host computing device, the host computing device can receive a microcode patch or other update from a trusted source and enter a system management mode (SMM), such as by receiving a system management interrupt (SMI) to interrupt normal hypervisor execution. Entering SMM causes the execution of all the physical processor cores except for a single physical core (e.g., the bootstrapping core) in the processor to be suspended in at least some conventional designs. The single physical core that remains executing will be responsible for applying the microcode patch. In some embodiments, it may be ensured that the processor finishes executing all of the microcode for the particular instruction that it was executing at the time of detecting the SMI or other interrupt signal before suspending the execution of the physical cores.

In accordance with various embodiments, the received patch (e.g., for firmware, software, or microcode) can be signed and/or encrypted by a trusted source, such as the service provider or processor manufacturer. In one example, the patch can be signed using a private key or other such credential of a trusted in order to ensure authenticity of the patch. If the patch is signed using a private key, the host computing device may need to validate the signature of the patch before applying the patch. In some embodiments, the public key used to verify the signature can be stored in a trusted platform module (TPM) (not shown) on the host computing device. In some embodiments, the patch can be encrypted using asymmetric or symmetric cryptography. For example, the patch may be encrypted using a public key in order to ensure privacy of the patch. If the patch is encrypted, then any intermediate parties that handle the patch cannot read the patch or ascertain its contents unless they have access to the private key used to the decrypt the patch. If the patch is encrypted, then the private key to decrypt the patch can be stored to the TPM, similarly to the public key for verifying the patch, as previously described. Once the patch is authenticated and/or decrypted, the patch can be applied to the host computing device 402. If SMM is used to apply the patch, then the instructions to apply the patch can be implemented in an SMI handler, or SMI handler can cryptographically verify and call a patch function pre-configured in a hypervisor.

Figure 5:
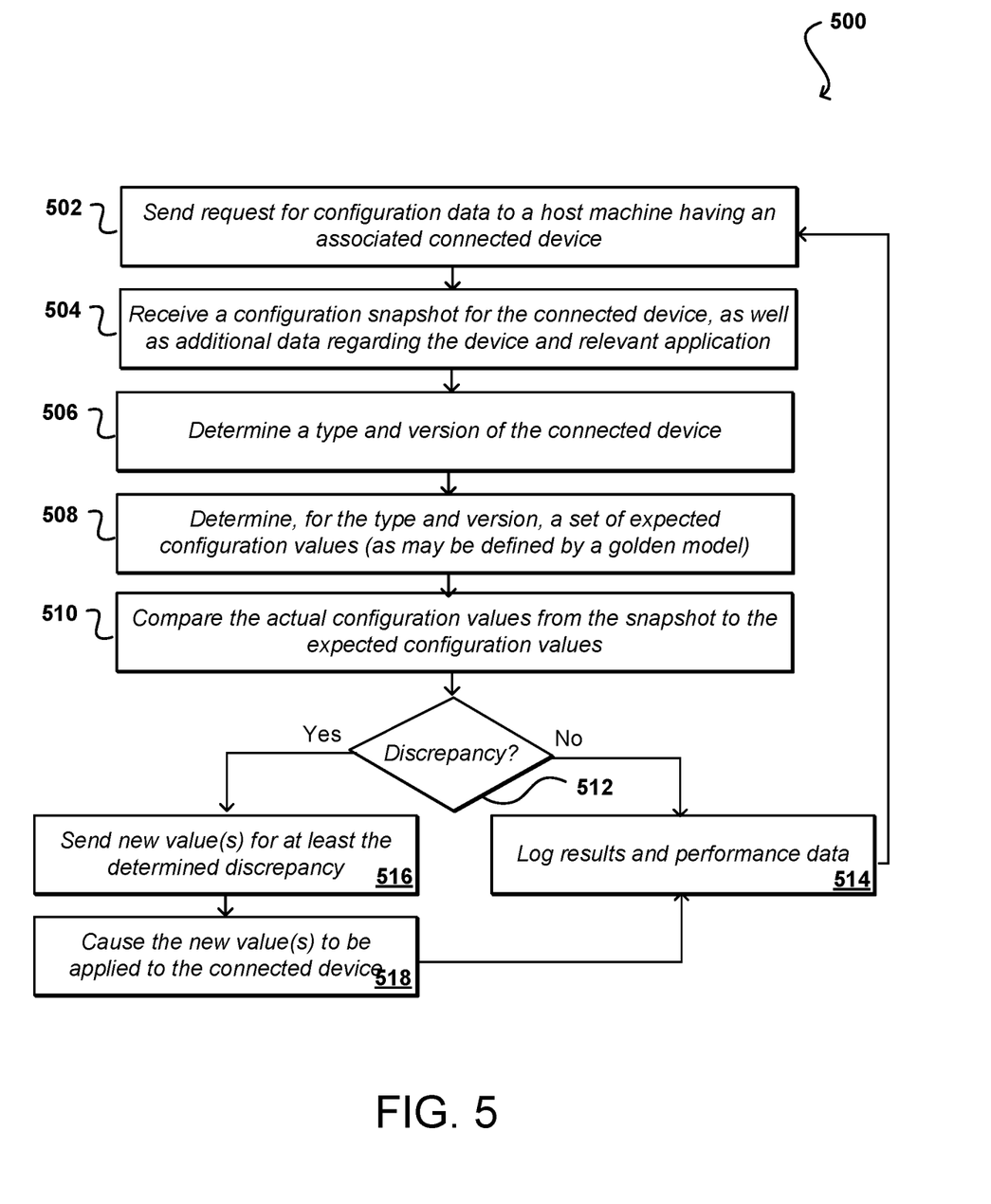
FIG. 5 illustrates an example process for managing configuration state for a plurality of connected devices that can be utilized in accordance with various embodiments.

FIG. 5 illustrates an example process 500 for managing the configuration values applied to a set of connected devices that can be utilized in accordance with one embodiment. It should be understood for this and other processes discussed herein that there can be additional, alternative, or fewer steps performed in similar or alternative orders, or in parallel, within the scope of the various embodiments unless otherwise stated. This example process can be performed by a configuration manager or cloud server, for example, which can be in communication with a host machine having an associated connected device, or other computer-related device or component, such as a network interface card or peripheral device, among other such options. In this example, a request for configuration data is sent 502 to a host machine having such an associated connected device. The request can be sent for any of a number of different reasons, such as part of a regular configuration monitoring process or as part of a testing or upgrade process, among other such options. As mentioned, the host device can pass the request along to the connected device, which can return a configuration snapshot generated using configuration information gathered from the connected device. The configuration snapshot, or other set of current configuration data, can then be received 504 in response to the request. There may be additional data provided as well, as may relate to a type or version of the connected device, information about the host, information about an application executing on the connected device, and so forth.

A type and version of the connected device can be determined 506, such as by using information included with the response. In other embodiments, type and version information may be stored for the various devices and mapped to an appropriate identifier, among other such options. Information about the type and version of the connected device can be used to determine 508 a set of expected configuration values for the device, as may be determined from an identified golden model for the type and version of device. Other information can be used to identify the appropriate golden model as well, as may relate to the host, application, or network state as discussed elsewhere herein. Once the expected values are determined for the connected device, those values can be compared 510 against the configuration values from the snapshot to determine whether there are any discrepancies between the expected or actual values. Any discrepancy may be a result of unexpected changes or improper configuration, or may result from an update to the golden model for the device, among other such options. If a discrepancy is determined 512 for one or more configuration values, or if a discrepancy is determined that outside an allowable variation in one or more values, then a new, updated, or correct value for the configuration parameter(s) can be sent 516 and caused 518 to be applied to the relevant connected device. If there are no discrepancies, or if there are unacceptable discrepancies and the values are made current, among other such options, then the results can be logged 514, as well as any performance data or other information received with, or determined for, the request.

Figure 6:
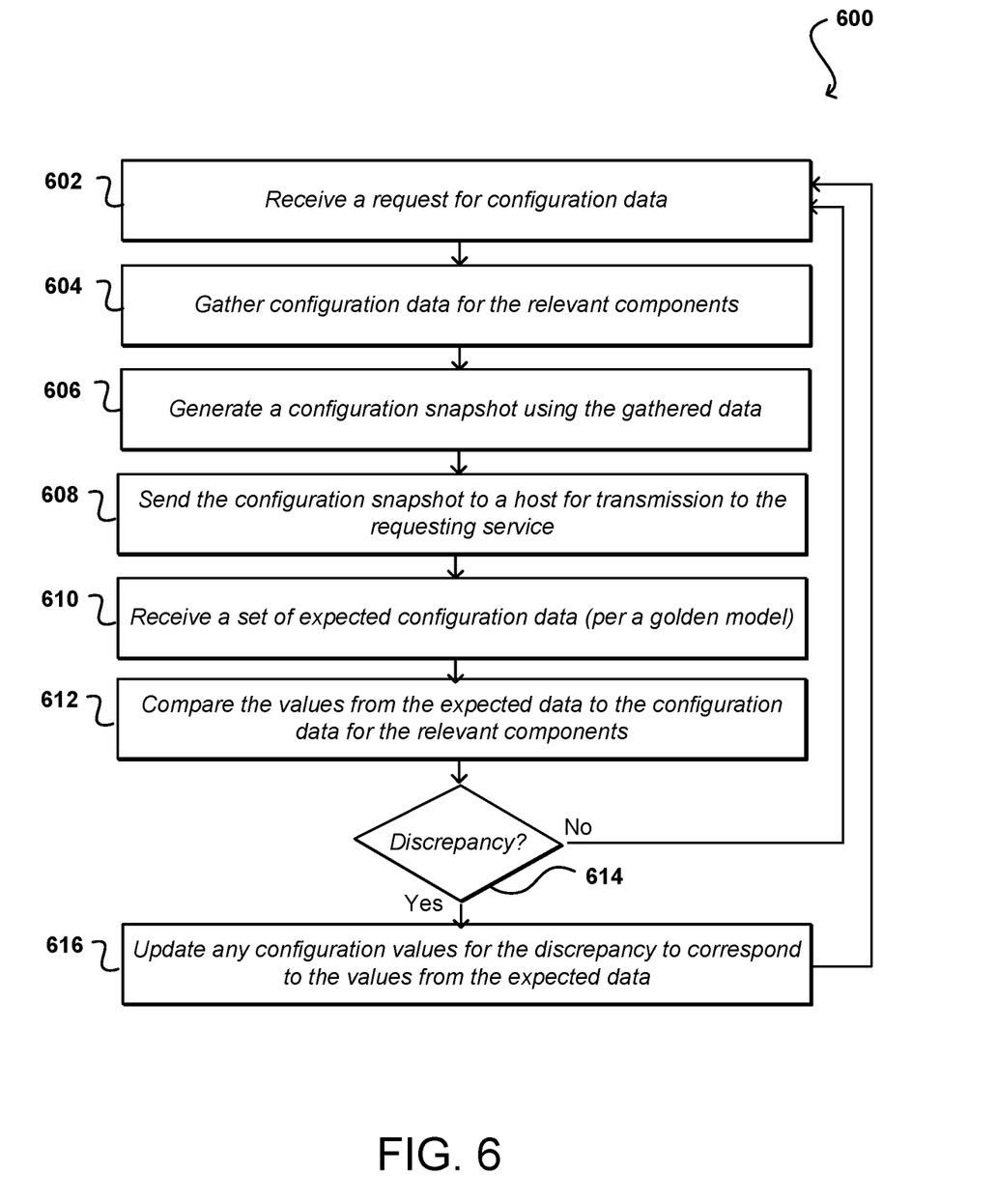
FIG. 6 illustrates an example process for providing performance data and updating configuration information on a connected device that can be utilized in accordance with various embodiments.

FIG. 6 illustrates an example process 600 that can be performed on the connected device, such as the network interface card installed on, or allocated to, a relevant host device. In this example, a request for configuration data is received 602. This request can be received from the host, and can have originated from a configuration manager or other such source, such as those discussed with respect to the process of FIG. 5. The connected device can gather 604 configuration data for the relevant components, which for a network interface card might include configuration data for a processor, memory, network interface, and the like. A configuration snapshot can be generated 606 using the gathered configuration information, as well as any other information to be provided, as may relate to the connected device, an application executing on the device, a determined network state, performance information, and the like. The snapshot can then be sent 608 in response to the request. In this example the snapshot is sent to the host, which will then forward it to the configuration manager or other such system or service, although the connected device could send directly to the intended recipient in at least some embodiments.

After sending the configuration snapshot, a set of expected configuration data can be received 610. As mentioned, the expected data can be determined using a golden model or other such set of values. In some embodiments the set of data will only be received in response to a determined discrepancy or potential discrepancy, while in other embodiments the set can be received at regular intervals or other such times. The values from the expected data can be compared 612 to the configuration data for the relevant components of the connected device. If no discrepancy is determined 614 then the process can continue using the current configuration values for the connected device. If any discrepancy is determined 614 then the relevant parameter(s) can be updated with the appropriate expected value(s) so as to reflect the expected configuration. The process can then continue using the newly applied values.

Figure 7:
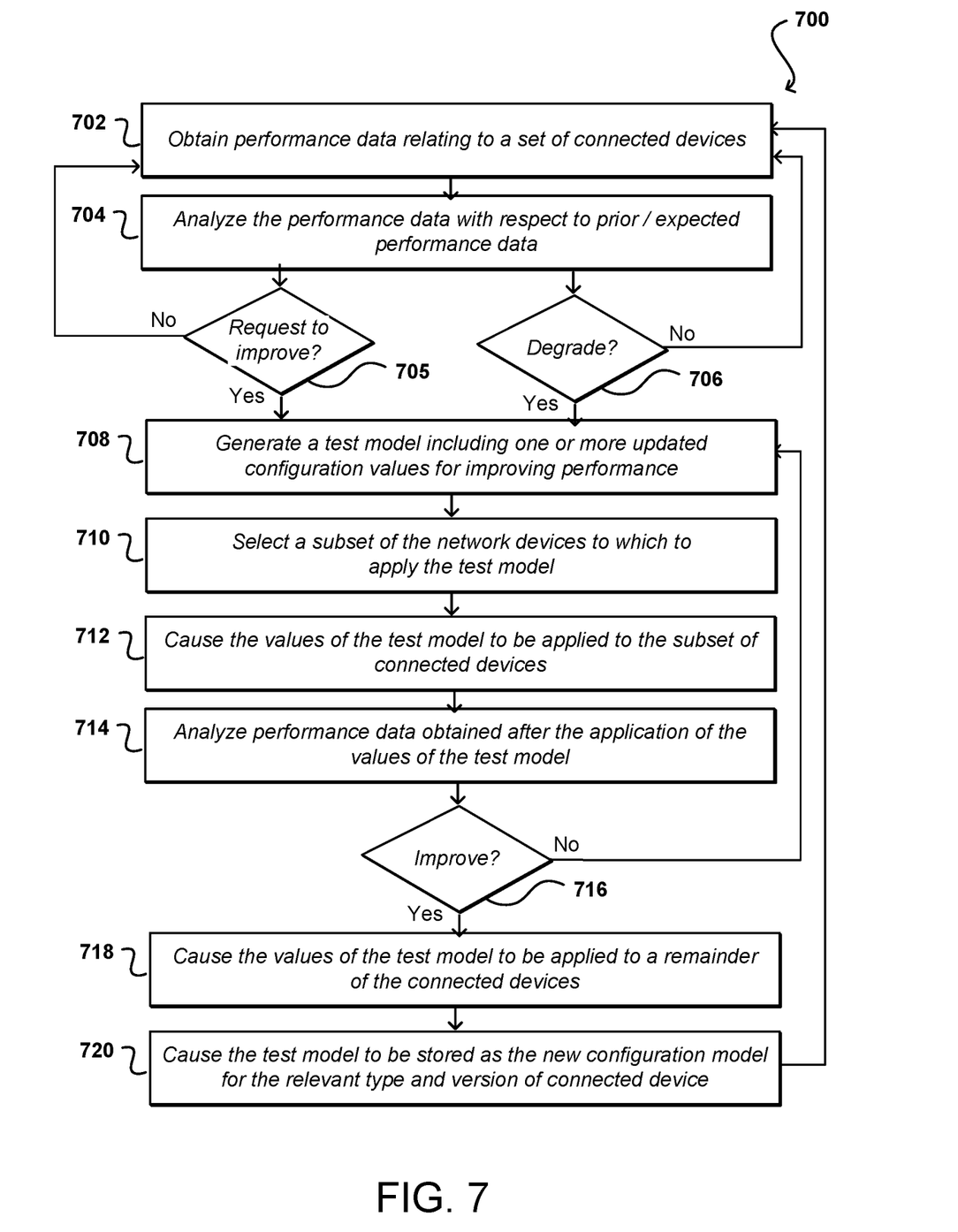
FIG. 7 illustrates an example process for updating configuration models for a set of connected devices that can be utilized in accordance with various embodiments.

FIG. 7 illustrates an example process 700 that can be used for testing or upgrading configuration information for a set of connected devices that can be utilized in accordance with various embodiments. In this example, performance data is obtained 702 for at least a portion of a network or environment that is related to a set of connected devices. As mentioned, this can include an environment that includes a set of hosts of one or more types configured to perform one or more tasks. The performance data can be analyzed 704 with respect to expected or prior performance data, for example, to determine whether there has been any significant change in performance, such as may relate to throughput, latency, bandwidth, utilization, or another such metric. In some instances there may be a desire to improve the performance of the system. If it is determined 705 that such a request is received, then generation of a test model can be performed. A test model can similarly be generated if it is determined that there has been an unacceptable amount of performance degradation in the system. If no significant degradation in performance is determined, such as where the performance remains in an expected range or does not vary by more than an allowable threshold, and there is no request or instruction received to attempt to improve performance, then the process can continue with the current configuration in place.

If however, an unacceptable degradation in performance is determined, then an attempt can be made to adjust the configuration values to improve performance. As mentioned, in some instances the attempt to adjust configuration values can be made simply to attempt to improve performance, even if no degradation has been determined, among other such options. In this example, a test mode is generated 708 that includes one or more updated configuration values that are determined to potentially improve performance when applied to the relevant connected devices or components. In order to test the new values, a subset of the connected devices is selected 710 to which to apply the test model. The values of the test model can be caused 712 to be applied to the selected subset of connected devices. As mentioned, this can include sending the values to respective hosts, which can pass the values along to the relevant devices. The performance data obtained after the application of the test values can then be analyzed 714. If it is determined 716 that the performance has not improved by at least a minimum threshold amount, or back to within an expected range, for example, then the process can continue with a new test model. If a model is determined to result in an appropriate improvement in performance then the values of the test model can be caused 718 to be applied to a remainder of the connected devices, at least of the appropriate type and version, and that are executing the corresponding application(s). The test model can also be caused 720 to be stored as a new configuration model for the relevant type and version of connected device. As mentioned, machine learning or another such process can be used to attempt to predict values that will result in performance improvements in at least some embodiments.

Figure 8:
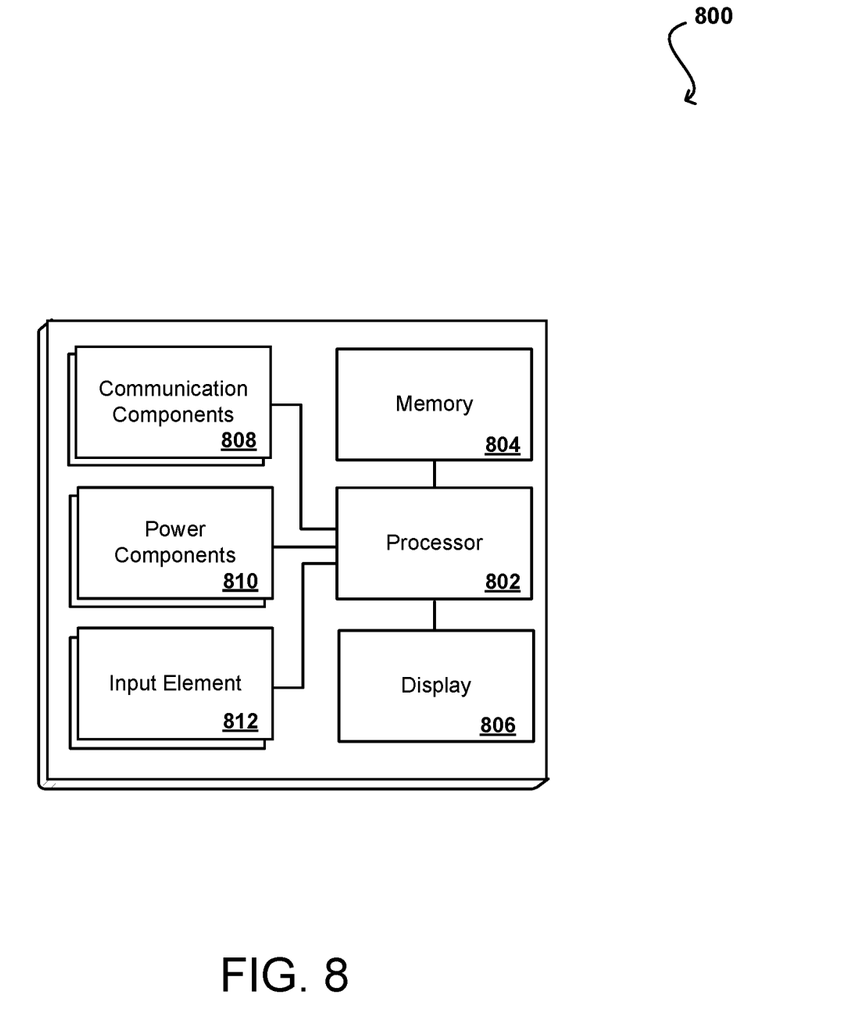
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example device also includes one or more communication components 808 operable to communicate with one or more electronic devices. The communication channel can be any appropriate channel used to enable devices to communicate wirelessly, such as Bluetooth, cellular, NFC, or Wi-Fi channels, as well as various wired communication channels such as Internet or Ethernet connections, local area network (LAN) channels, and the like. The device also includes a power system including various power components 810, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 812 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other connected devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
sending, from a monitoring service to a host machine having a hardware offload card installed thereon, a request for configuration information for the hardware offload card;
receiving, to the monitoring service, a configuration snapshot for the hardware offload card, the configuration snapshot including current configuration values for a processor and memory of the hardware offload card;
determining, based upon a type of the hardware offload card and an intended function of the hardware offload card, a configuration model including a set of expected configuration values;
determining a discrepancy between the set of expected configuration values of the configuration model and the current configuration values from the configuration snapshot; and
causing the expected configuration values corresponding to the discrepancy to be automatically applied to the hardware offload card to eliminate the discrepancy.

2. The computer-implemented method of claim 1, further comprising:

determining the configuration model based further on at least one of a version of the hardware offload card, a type of the host machine, an application executing on the hardware offload card, a current operational context, or a current network state.

3. The computer-implemented method of claim 1, further comprising:
analyzing performance information received with the configuration snapshot;
determining, based upon analyzing the performance information, an updated configuration value for the configuration model to improve performance of the hardware offload card; and
causing the updated configuration value to be automatically applied to the hardware offload card.

4. The computer-implemented method of claim 1, wherein the configuration values correspond to metrics associated with at least one of a processor speed, number of processor cores, bus type, number of channels, memory frequency, error correction support, network connection speed, supported interface, bus configuration, or communication interface width attribute.

5. The computer-implemented method of claim 1, further comprising:
determining a set of testing configuration values of a test configuration model;
determining a subset of hardware offload cards corresponding to the test configuration model;
causing the set of testing configuration values to be applied to the subset of hardware offload cards;
determining an improvement in performance of the subset of hardware offload cards; and
causing the set of testing configuration values to be applied to a remainder of the hardware offload cards corresponding to the test configuration model.

6. A computer-implemented method, comprising:
sending a request for a current configuration value to a host machine on which a connected device is installed;
obtaining, from the host machine, the current configuration value for the current configuration value collected by the connected device;
determining intended functionality for the connected device;
determining, based upon the intended functionality and a type of the connected device, an expected configuration value for the connected device;
determining a discrepancy between the current configuration value and the expected configuration value; and
causing the expected configuration value, corresponding to the discrepancy, to be automatically applied to the connected device.

7. The computer-implemented method of claim 6, further comprising:
causing the expected configuration value to be automatically applied to the connected device by sending a configuration model, including a set of expected configuration values, to the host machine to be passed to the connected device for comparison.

8. The computer-implemented method of claim 6, further comprising:
receiving the expected configuration value in a configuration snapshot generated by the connected device.

9. The computer-implemented method of claim 8, further comprising:
receiving respective configuration snapshots from a plurality of connected devices;
analyzing respective configuration values from the configuration snapshots and performance information for the plurality of connected devices;
determining an updated set of expected parameters based upon the respective configuration values and the performance information; and
causing the updated set to be applied to the plurality of connected devices.

10. The computer-implemented method of claim 9, further comprising:
processing the respective configuration values and the performance information using a trained machine learning model to generate the updated set of expected parameters.

11. The computer-implemented method of claim 9, further comprising:
scanning a set of host machines to identify the plurality of connected devices that support automatic configuration management.

12. The computer-implemented method of claim 6, wherein the connected device is a network interface card (NIC) having a set of components including at least one processor, memory, and a network communication interface, the current configuration value corresponding to the set of components.

13. The computer-implemented method of claim 6, further comprising:
determining a set of testing configuration values of a test configuration model;
determining a subset of connected devices corresponding to the test configuration model;
causing the set of testing configuration values to be applied to the subset of connected devices;
determining an improvement in performance of the subset of connected devices; and
causing the set of testing configuration values to be applied to a remainder of the connected devices corresponding to the test configuration model.

14. The computer-implemented method of claim 6, further comprising:
determining a respective virtual machine, of a plurality of virtual machines hosted on the host machine, associated with the connected device; and
determining the set of expected configuration values for the connected device based further upon information for the respective virtual machine.

15. A system, comprising:
at least one processor; and
memory including instructions that, when executed by the at least one processor, cause the system to:
send a request for a current configuration value to a host machine on which a connected device is installed;
receive, from the host machine, the current configuration value collected by the connected device;
determine intended functionality for the connected device;
determine, based upon the intended functionality and a type of the connected device, an expected configuration value for the connected device;
determine a discrepancy between the current configuration value and the expected configuration value; and
cause the expected configuration value, corresponding to the discrepancy, to be automatically applied to the connected device.

16. The system of claim 15, wherein the instructions when executed further cause the system to:

cause the expected configuration value to be automatically applied to the connected device by sending a configuration model, including a set of expected configuration values, to the host machine to be passed to the connected device for comparison.

17. The system of claim 16, wherein the instructions when executed further cause the system to:
receive respective configuration snapshots from a plurality of connected devices;
analyze respective configuration values from the configuration snapshots and performance information for the plurality of connected devices; and
determine a new expected configuration value based upon the respective configuration values and the performance information.

18. The system of claim 15, wherein the instructions when executed further cause the system to:
determine a set of testing configuration values of a test configuration model;
determine a subset of connected devices corresponding to the test configuration model;
cause the set of testing configuration values to be applied to the subset of connected devices;
determine an improvement in performance of the subset of connected devices; and
cause the set of testing configuration values to be applied to a remainder of the connected devices corresponding to the test configuration model.

19. A device, comprising:
a processor;
a communication interface; and
memory including instructions that, when executed by the processor, cause the device to:
receive, via a host machine on which the device is installed and from a computing system connected to the device via the communication interface, a request for a current configuration value;
obtain the current configuration value collected by the device;
generate a configuration snapshot including the current configuration value;
provide the configuration snapshot in response to the request;
receive, from the computing system, an updated configuration value based on a discrepancy between the current configuration value and an intended configuration value; and
cause the updated configuration value to be automatically applied to the device in place of the current configuration value.

* * * * *